(No Model.)
G. C. McCULLOUGH.
GALVANIC BATTERY.
No. 451,948. Patented May 12, 1891.
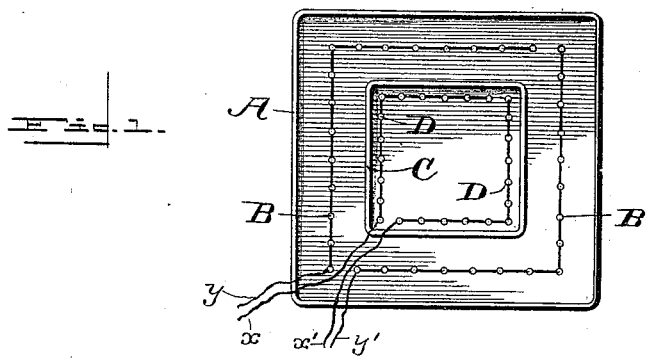
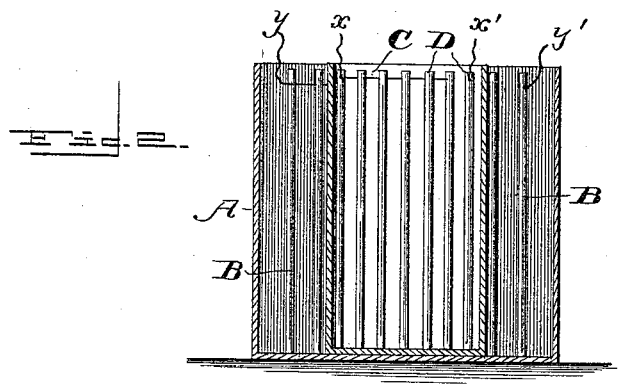
Witnesses
Walter H. Pumphrey
O. D. Baker
Inventor
George C. McCullough
By his Attorneys
Whitaker & Prevost.

UNITED STATES PATENT OFFICE.

GEORGE C. McCULLOUGH, OF RICHMOND, INDIANA, ASSIGNOR OF ONE-HALF TO WILLIAM P. COOK AND WILLIAM A. BAUMER, BOTH OF SAME PLACE.

GALVANIC BATTERY.

SPECIFICATION forming part of Letters Patent No. 451,948, dated May 12, 1891.

Application filed September 3, 1890. Serial No. 363,825. (No model.)

*To all whom it may concern:*

Be it known that I, GEORGE C. MCCULLOUGH, a citizen of the United States, residing at Richmond, in the county of Wayne and State of Indiana, have invented certain new and useful Improvements in Galvanic Batteries; and I do hereby declare the following to be a full, clear, and exact description of the invention, such as will enable others skilled in the art to which it appertains to make and use the same.

My invention is an improvement in primary batteries; and it consists in the novel features hereinafter fully described, reference being had to the accompanying drawings, in which I have illustrated one form of cell which may be advantageously used in carrying my invention into effect.

My said invention is fully disclosed in the following description and claims.

In the said drawings, Figure 1 is a top plan view of a battery-cell which I prefer to employ in carrying out my invention. Fig. 2 is a vertical section of the same.

My invention has for its object to provide a solution for zinc and carbon batteries, whereby a strong battery is produced which is capable of being used continuously for a great length of time without recharging and without running down; and my invention also contemplates an arrangement of the elements and electrical connections of said battery, whereby one set of zincs and carbons is permitted to rest while another set is being used, both sets being in the same solution.

In the drawings I have shown a cell consisting of the outer receptacle A, in which are located two series of carbon sticks B, the sticks of each series being connected together by suitable electrical connections, the two series not being connected. Within the receptacle A is a porous cup or receptacle C, in which are placed two series of zinc sticks D, connected in a similar manner.

In the outer receptacle I place the exciting liquid, which is prepared as follows and in the following proportions: To six gallons of water add one pound of common salt, (chloride of sodium,) coarse, and dissolve. Decant or filter the solution, divide it into two parts, and add to one part two and one-half pounds of bichromate of potash, (powdered.) To the other half of the solution add one and one-half pounds of permanganate of potash. The two solutions resulting are also filtered or decanted separately, and to each is added three and one-half pounds of sulphuric acid, the solutions being then allowed to cool. When cold, mix the two solutions together. A portion of this liquid is placed in the outer receptacle A of the battery-cell. The inner porous receptacle is filled with a solution of sulphate of zinc, which surrounds the zincs and prevents them from being consumed too rapidly, and at the same time assists in restoring the zincs when not in use. The electrical conducting-wires $x\,x'$ leading out of the battery are connected each with one series of zincs, and the conductors $y\,y'$ are connected each with one series of the carbon sticks, as is clearly shown in the drawings. This constitutes a battery having two pairs of elements in the same solutions.

In using a single cell or a battery of several cells I connect the wires $x\,y$ with the line using the current, and allow the pair of elements connected therewith to be used for a certain length of time, after which I switch the wires $x\,y$ out of the circuit and switch in the elements connected with the wires $x'\,y'$, thereby permitting the pair of elements which have been in use to rest. By repeating this operation the battery may be used continuously for a very great length of time, and the consumption of the zincs will not be so rapid by a considerable amount as when one set of zincs are used continuously.

Where the battery is used at different times for different purposes and on different lines I find it advantageous when switching from one line to another to throw one pair of elements and then the other pair into use alternately, and permitting each pair to rest alternately while not in use.

By employing the solutions above described a battery of great strength is produced, and one which will stand continuous use for a great length of time without giving out or needing recharging.

It will be understood that I do not wish to limit myself to the use of a cell constructed exactly as that shown in the drawings, as the exciting liquid employed by me can be used in any battery employing zinc and carbon elements.

What I claim, and desire to secure by Letters Patent, is—

1. A galvanic-battery cell provided with positive and negative elements and supplemental positive and negative elements, whereby one pair of elements may be used while the other pair is permitted to rest, substantially as described.

2. In a galvanic battery, the combination, with the zinc and carbon elements, of an exciting solution composed of water, salt, bichromate of potash, permanganate of potash, and sulphuric acid, in about the proportions specified.

3. In a galvanic battery, the combination, with the zinc and carbon elements, of a solution composed of water, salt, bichromate of potash, permanganate of potash, and sulphuric acid surrounding one element, and a solution of sulphate of zinc surrounding the other element and separated from the first solution by a porous partition, substantially as described.

In testimony whereof I affix my signature in presence of two witnesses.

GEORGE C. McCULLOUGH.

Witnesses:
 L. P. WHITAKER,
 W. H. PUMPHREY.